United States Patent [19]

Saito et al.

[11] Patent Number: 5,744,562
[45] Date of Patent: Apr. 28, 1998

[54] ACRYLIC COPOLYMER ELASTOMER, ITS BLEND RUBBER AND BLEND RUBBER COMPOSITION

[75] Inventors: Kuniyoshi Saito, Iwaki; Iwao Moriyama, Takahagi; Jun Okabe, Kitaibaraki, all of Japan

[73] Assignee: Nippon Mektron, Limited, Tokyo, Japan

[21] Appl. No.: 686,078

[22] Filed: Jul. 24, 1996

[30] Foreign Application Priority Data

| | | | |
|---|---|---|---|
| Jul. 25, 1995 | [JP] | Japan | 7-209179 |
| Aug. 11, 1995 | [JP] | Japan | 7-227018 |
| Jan. 24, 1996 | [JP] | Japan | 8-029841 |
| Mar. 22, 1996 | [JP] | Japan | 8-093486 |
| May 15, 1996 | [JP] | Japan | 8-144917 |

[51] Int. Cl.$^6$ .................................... C08F 30/08
[52] U.S. Cl. .............................. 526/279; 526/320
[58] Field of Search ............................ 526/279, 320

[56] References Cited

U.S. PATENT DOCUMENTS 3,497,571   2/1970   Tellier et al. .

FOREIGN PATENT DOCUMENTS

| | | | |
|---|---|---|---|
| 0541227 | 5/1993 | European Pat. Off. | 526/279 |
| 1 456 738 | 1/1967 | France . | |
| 60-53514 | 3/1985 | Japan | 526/279 |
| 540 940 | 10/1973 | Switzerland . | |
| 0952855 | 8/1982 | U.S.S.R. | 526/279 |

OTHER PUBLICATIONS

Doc.125:222601 Whale et al. J. Mater. Chem 6(9), 1479–1485, 1996 in house search pp. 6–8.
Doc. No. 92:130391 Tatsu et al. JP 54135841 Oct. 22, 1979—in house search pp. 66–67.
Doc. No. 92:130390 Tatsu et al JP 54135842 Oct. 22, 1979—in house search, pp. 67 and 68.

Primary Examiner—Joseph L. Schofer
Assistant Examiner—N. Sarofim
Attorney, Agent, or Firm—Kenyon & Kenyon

[57] ABSTRACT

A copolymer comprising an alkyl acrylate and an unsaturated ester compound represented by the following general formula:

(1) $CH_2=CRCOO(CH_2)nPhOR'$, (2) $CH_2=CRCOO(CH_2)nOCO(CH_2)mPhOR'$, (3) $CH_2=CHOCO(CH_2)nOCO(CH_2)mPhOR'$, (4) $CH_2=CHO(CH_2)nOCO(CH_2)mPhOR'$ or (5) $CH_2=CHPh(CH_2)nOCO(CH_2)mPhOR'$ where R is a hydrogen atom or a methyl group; R' is a hydrogen atom, an acyl group or a trialkylsilyl group; and Ph is a phenylene group, forms a blend rubber having a good heat resistance and a good amine resistance with a fluorine-containing elastomer.

2 Claims, 1 Drawing Sheet

ACRYLIC COPOLYMER ELASTOMER, ITS BLEND RUBBER AND BLEND RUBBER COMPOSITION

BACKGROUND OF THE INVENTION

1. Field of the Invention

The present invention relates to an acrylic copolymer elastomer, its blend rubber and a vulcanizable blend rubber composition, and more particularly to an acrylic copolymer elastomer blendable with a fluorine-containing elastomer, a blend rubber of the acrylic copolymer elastomer and a fluorine-containing elastomer, and a vulcanizable blend rubber composition.

2. Related Prior Art

Acrylic copolymer elastomers (acrylic rubber) have good oil resistance and heat resistance and are cheap, and thus have been widely used as vulcanization-molding materials such as automobile sealing materials, etc. Due to recent higher efficiency of automobile engines and consequent higher temperature in the use circumstances, materials of much higher heat-resistance are in demand.

Fluorine-containing elastomers (fluorine rubber), on the other hand, are used particularly at positions requiring a higher heat resistance among the automobile engine sealing materials owing to their distinguished heat resistance, but are very expensive. Furthermore, the fluorine rubber has such a disadvantage as a poor amine resistance, as compared with acrylic rubber. Various attempts, for example, formulation change, etc. have been so far made to improve the disadvantage, but no better amine resistance has been obtained yet. In the circumstances using an automobile engine oil containing an amine-based additive, there are fears of functional deterioration in the fluorine rubber product. Thus, the improvement of amine resistance is still keenly desired for the fluorine rubber.

In these situations, many attempts have been also made to blend acrylic rubber with fluorine rubber, thereby satisfying the required heat resistance and cost at the same time, but the conventional technique of cross-linking these two rubbers by a cocross-linking agent capable of cocross-linking these two rubbers can hardly satisfy even the intermediate heat resistance between the heat resistance of acrylic rubber and that of fluorine-containing, and no satisfactory amine resistance has been obtained yet.

SUMMARY OF THE INVENTION

An object of the present invention is to provide an acrylic copolymer elastomer blendable with a fluorine-containing elastomer, which can give a blend rubber having an intermediate heat resistance between the heat resistance of acrylic copolymer elastomer and that of fluorine-containing elastomer, when blended with the fluorine-containing elastomer, and also having a good amine resistance.

Another object of the present invention is to provide a blend rubber comprising such a acrylic copolymer elastomer as above and a fluorine-containing elastomer, and also provide its vulcanizable composition.

According to the present invention, there is provided an acrylic copolymer elastomer, which is a copolymer of an alkyl acrylate having an alkyl group having 1 to 8 carbon atoms with an unsaturated ester compound having a hydroxyphenyl group, an acetoxyphenyl group or a trialkylsilyloxy group as a terminal group.

According to the present invention, the acrylic copolymer elastomer can be formed into a blend rubber by blending with a fluorine-containing elastomer, and the blend rubber can be formed into a vulcanizable composition by adding to the blend rubber (1) a vulcanizing system comprising a quaternary onium salt and an acid acceptor, (2) a vulcanizing system comprising a tertiary sulfonium salt and an acid acceptor, or (3) a vulcanizing system comprising a tertiary phosphine compound, an epoxy compound and an acid acceptor.

DETAILED DESCRIPTION OF THE INVENTION

The acrylic copolymer elastomer for use in the present invention comprises abut 80 to abut 99.9% by weight, preferably abut 80 to about 99% by weight, of alkyl acrylate having an alkyl group having 1 to 8 carbon atoms as the main component. The alkyl acrylate includes, for example, alkyl acrylates, whose alkyl group is methyl, ethyl, n-propyl, isopropyl, n-butyl, isobutyl, n-amyl, n-hexyl, 2-ethylhexyl, n-octyl, etc., and alkyl acrylates having a substituted alkyl group, such as 2-cyanoethyl acrylate, etc. Preferably, ethyl acrylate and n-butyl acrylate are used. These alkyl acrylates can be used in a mixture of at least two thereof.

The unsaturated ester compound having a hydroxyphenyl group, an acetoxyphenyl group or a trialkylsilyloxy group as a terminal group for use in copolymerization with the alkyl acrylate includes the following compounds (1) to (5), where copolymers of (1) to (4) with the alkyl acrylate each provide novel acrylic copolymer elastomers:

(1) $CH_2=CRCOO(CH_2)_nPhOR'$ (2) $CH_2=CRCOO(CH_2)_nOCO(CH_2)_mPhOR'$ (3) $CH_2=CHOCO(CH_2)_nOCO(CH_2)_mPhOR'$ (4) $CH_2=CHO(CH_2)_nOCO(CH_2)_mPhOR'$ (5) $CH_2=CHPh(CH_2)_nOCO(CH_2)_mPhOR'$ where R: hydrogen atom or a methyl group R': hydrogen atom, an acyl group or a trialkylsilyl group Ph: a phenylene group, preferably a p-phenylene group, the phenylene group may have an alkyl group, an alkoxyl group, an alkoxyalkyt group, etc. as a substituent group n: an integer of 1 to 6 m: 0 or an integer of 1 to 3

The unsaturated ester compound represented by the foregoing formula (1) includes, for example:

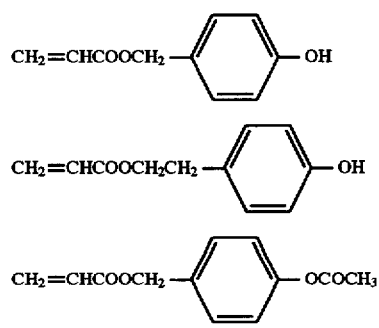

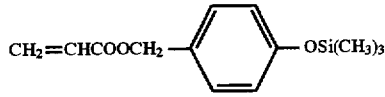

The unsaturated ester compound represented by the foregoing formula (2) includes, for example:

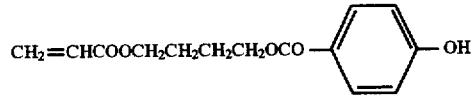

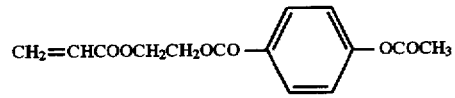

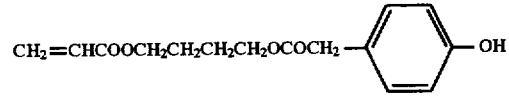

The unsaturated ester compound represented by the foregoing formula (3) includes, for example:

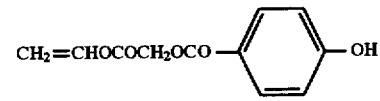

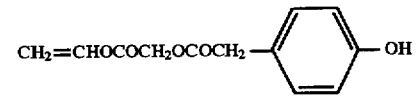

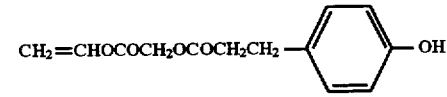

The unsaturated ester compound represented by the foregoing formula (4) includes, for example:

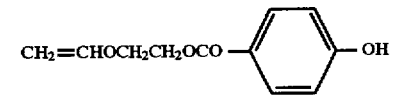

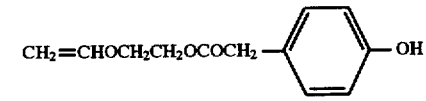

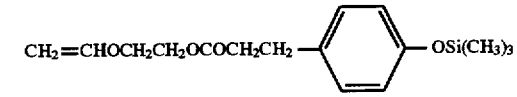

The unsaturated ester compound represented by the foregoing formula (5) includes, for example:

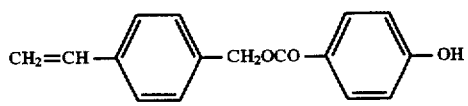

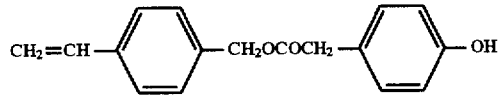

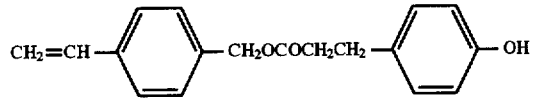

These compounds are synthesized in the following manner:

(1) $CH_2=CRCOX + HO(CH_2)_n PhOH$
$\rightarrow CH_2=CRCOO(CH_2)_n PhOH$ (X: halogen atom)

This reaction can be carried out as a condensation reaction of (meth)acrylic acid halide with 4-hydroxybenzyl alcohol, 4-hydroxyphenetyl alcohol or the like in the presence of a catalyst such as triethylamine or the like.

$HO(CH_2)_n PhOH \rightarrow CH_2=CRCOO(CH_2)_n PhOR'$

This reaction can be carried out under the reaction conditions for the ordinary acylation reaction or trialkylsilylation reaction by adding to 4-hydroxybenzyl alcohol, 4-hydroxyphenetyl alcohol or the like an acylating agent, for example, an acid anhydride such as acetic anhydride, propionic anhydride, butyric anhydride, etc., or an acid halide such as acetyl halide, propionyl halide, butryl halide, etc., or trialkylhalogenosilane such as trimethylhalogenosilane, triethylhalogenosilane, etc.

Or, the synthesis can be carried out through a direct condensation reaction, using 4-acetoxybenzyl alcohol, etc. as a raw material, as given by the following reaction equation:

$CH_2=CRCOX + HO(CH_2)_n PhOR' \rightarrow CH_2=CRCO(CH_2)_n PhOR'$
(X: halogen atom)

(2) $CH_2=CRCOO(CH_2)_n OH + HOCO(CH_2)_m PhOH$
$\rightarrow CH_2=CRCOO(CH_2)_n OCO(CH_2)_m PhOH$ This reaction can be carried out as a condensation reaction of ω-hydroxyalkyl (meth)acrylate with 4-hydroxybenzoic acid, 4-hydroxyphenylacetic acid or the like in the presence of a dehydrating agent such as N,N'-cyclohexylcarbodiimide or the like. The reaction can be also carried out as a dehydrohalogenation reaction using an acid halide of 4-hydroxybenzoic acid, 4-hydroxyphenylacetic acid or the like in place of these acids. Then, the reaction for —PhOH→—PhOR' can be carried out in the same manner as in (1).

(3) $CH_2=CHOCO(CH_2)_n X + HOCO(CH_2)_m PhOH$
$\rightarrow CH_2=CHOCO(CH_2)_n OCO(CH_2)_m PhOH$ (X: halogen atom)

Synthesis can be carried out as a condensation reaction of vinyl monohalogenocarboxylate such as vinyl monochloroacetate with 4-hydroxybenzoic acid, 4-hydroxyphenylacetic acid or the like in the presence of a triethylamine catalyst, etc. Then, the reaction for —PhOH→—PhOR' can be carried out in the same manner as in (1).

(4) $CH_2=CHO(CH_2)_n X + HOCO(CH_2)_m PhOH \rightarrow CH_2=CHO$ (CH₂)nOCO(CH₂)mPhOH (X: halogen atom)

Synthesis can be carried out as a condensation reaction of ω-halogenoalkyl vinyl ether such as 2-chloroethyl vinyl ether with 4-hydroxybenzoic acid, 4-hydroxyphenylacetic acid or the like in the presence of an aqueous solution of sodium hydroxide, etc. as a catalyst. Then, the reaction for —PhOH—→—PhOR' can be carried out in the same manner as in (1).

(5) CH₂=CHPh(CH₂)nX+HOCO(CH₂)mPhOH
→CH₂=CHPh(CH₂)nOCO(CH₂)mPhOH (X: halogen atom)

Synthesis can be carried out as a condensation reaction of halogenoalkylstyrene such as p-chloromethylstyrene with 4-hydroxybenzoic acid, 4-hydroxyphenylacetic acid or the like in the presence of a triethylamine catalyst, etc. Then, the reaction for —PhOH—→—PhOR' can be carried out in the same manner as in (1).

These copolymers can be each further copolymerized with other vinyl monomers, olefin monomers, diene monomers, etc. to such an extent as not to deteriorate characteristics of the resulting copolymers (e.g. not more than about 40% by weight, preferably not more than abut 20% by weight, on the basis of the resulting copolymer). The other vinyl monomers include, for example, alkoxyalkyl acrylates having an alkoxyalkyl group having 2 to 8 carbon atoms, such as methoxymethyl acrylate, ethoxymethyl acrylate, 2-methoxyethyl acrylate, 2-ethoxyethyl acrylate, 2-butoxyethyl acrylate, etc., cyanoalkyl acrylate, vinyl chloride, vinylidene chloride, acrylonitrile, styrene, vinyl acetate, ethyl vinyl ether, alkyl methacrylate, furfuryl acrylate, 2-acetoxyethyl acrylate, 2-propoxyethyl acrylate, 4-acetoxybutyl acrylate, 4-propoxybutyl acrylate, ethylene glycol dimethacrylate, etc. Furthermore, the copolymers can be each copolymerized with a cross-linkable group-containing vinyl monomer such as vinyl monochloroacetate, glycidyl methacrylate, acrylic acid, vinylsilyl group-containing acrylate, etc. The olefin monomers include, for example, ethylene, propylene, etc., and the diene monomers include, for example, divinylbenzene, isoprene, pentadiene, ethylidenenorbornene, etc.

Copolymerization reaction can be carried out in the presence of an ordinary radical polymerization initiator by any one of emulsion polymerization, suspension polymerization, solution polymerization, bulk polymerization, etc., preferably by emulsion polymerization. A redox polymerization initiator can be also used. In the resulting acrylic copolymer elastomer, about 50 to about 90% by weight of the unsaturated ester compound is copolymerized at a degree of polymerization of, for example, 90%. The acrylic copolymer elastomer has a Mooney viscosity (100° C.) of generally about 10 to about 100 pts, preferably about 20 to about 60 pts.

The acrylic copolymer elastomer (acrylic rubber) is blended with a fluorine-containing elastomer (fluorine rubber) in a blend ratio of acrylic rubber to fluorine rubber of about 90 to abut 10: about 10 to about 90% by weight, preferably 80 to 20: 20 to 80% by weight, the sum total being 100% by weight. The blend rubber within the above-mentioned ratio range shows an intermediate heat resistance between the heat resistance of acrylic rubber and that of fluorine rubber, and also has a good amine resistance. Blending can be carried out by any of a kneading method using an open roll, a mixer or the like, a method of mixing in a latex state and then coprecipitation by salting-out or the like and a method of mixing in a solution state and solvent removal, etc.

The fluorine-containing elastomer for use in the blending is vinylidene fluoride copolymer rubbers including, for example, terpolymer rubber of vinylidene fluoride—hexafluoropropene—tetrafluoroethylene, copolymer rubber of vinylidene fluoride—hexafluoropropene, terpolymer rubber of vinylidene fluoride—tetrafluoroethylene—chlorotrifluoroethylene, copolymer rubber of vinylidene fluoride—chlorotrifluoroethylene, terpolymer rubber of vinylidene fluoride—tetrafluoroethylene—propylene, etc. Besides, copolymer rubber of tetrafluoroethylene—propylene etc. can be also used. These fluorine-containing elastomers may be copolymer elastomers obtained by copolymerization in the presence of a saturated or unsaturated compound containing at least one of bromine and iodine.

The thus obtained blend rubber can be made into a vulcanizable blend rubber composition by adding thereto (1) a vulcanizing system comprising a quaternary onium salt and an acid acceptor, (2) a vulcanizing system comprising a tertiary sulfonium salt and an acid acceptor, or (3) a vulcanizing system comprising a tertiary phosphine compound, an epoxy compound and an acid acceptor.

As a quaternary onium salt, about 0. 1 to about 30 parts by weight, preferably about 1 to about 20 parts by weight, of at least one of an ammonium salt and a phosphonium salt represented by the following general formula can be used per 100 parts by weight of blend rubber. Below about 0.1 parts by weight, no vulcanization products having desired properties can be obtained, whereas above 30 parts by weight vulcanization products have a smaller stretchability and are less practical:

(R₁R₂R₃R₄N)⁺X⁻

(R₁R₂R₃R₄P)⁺X⁻ where R₁ to R₄ are each an alkyl group having 1 to 25 carbon atoms, an alkoxy group, an aryl group, an alkylaryl group, an aralkyl group or a polyoxyalkylene group, or two or three of which may form a heterocyclic structure together with P or N; and X⁻ is an anion such as Cl⁻, Br⁻, I⁻, HSO₄⁻, H₂PO₄⁻, RCOO⁻, ROSO₂⁻, RSO⁻, ROPO₂H⁻, CO₃⁻, etc.

Specifically, the quaternary onium salt includes, for example, quaternary ammonium salts such as tetraethylammonium bromide, tetrabutylammonium chloride, tetrabutylammonium bromide, tetrabutylammonium iodide, n-dodecyltrimethylammonium bromide, cetyldimethylbenzylammonium chloride, methylcetyldibenzylammonium bromide, cetyldimethylethylammonium bromide, octadecyltrimethylammonium bromide, cetylpyridinium chloride, cetylpyridinium bromide, cetylpyridinium iodide, cetylpyridinium sulfate, 1-benzylpyridinium chloride, 1-benzyl-3, 5-dimethylpyridinium chloride, 1-benzyl-4-phenylpyridinium chloride, 1,4-dibenzylpyridinium chloride, 1-benzyl-4-(pyrrolidinyl)pyridinium chloride, 1-benzyl-4-pyridinopyridinium chloride, tetraethylammonium acetate, trimethylbenzylammonium benzoate, trimethylbenzylammonium-p-toluene sulfonate, trimethylbenzylammonium borate, 8-benzyl-1,8-diazabicyclo [5,4,0]-undec-7-enium chloride, 1, 8-diazabicyclo [5,4,0]-undecen-7-methylammonium methosulfate, 5-benzyl-1, 5-diazabicyclo[4,3,0]-5-nonenium chloride, 5-benzyl-1, 5-diazabicyclo-[4,3,0]-5-nonenium bromide, 5-benzyl-1,5-diazabicyclo[4,3,0]-5noneniumtetrafluoroborate, 5-benzyl-1,5-diazabicyclo[4,3,0]-5nonenium hexafluorophosphate, etc., and quaternary phosphonium salts such as tetraphenylphosphonium chloride, triphenylbenzylphosphonium chloride, triphenylbenzylphosphonium bromide, triphenylmethoxymethylphosphonium chloride, triphenylmethylcarbonylmethylphosphonium chloride, triphenylethoxycarbonylmethylphosphonium chloride, trioctylbenzylphosphonium chloride, trioctylmethylphosphonium bromide, trioctylethylphosphonium acetate, trioctylethylphosphonium dimethyl phosphate, tetraoctylphosphonium chloride, cetyldimethylbenzylphosphonium chloride, etc.

As a tertiary sulfonium salt, about 0.1 to abut 10 parts by weight, preferably about 0. 5 to about 5 parts by weight, of at least one of phosphonium salts, represented by the following formula, preferably aromatic sulfonium salts, is used per 100 parts by weight of blend rubber. Below about 0.1 parts by weight no vulcanization products having desired properties can be obtained, whereas above about 10 parts by weight vulcanization products have a smaller stretchability and are less practical:

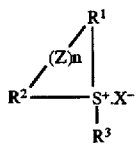

where $R_1$, $R^2$ and $R_3$ are an aryl group having 4 to 20 carbon atoms or an alkyl group having 1 to 20 carbon atoms, and at least one of which is an aryl group; Z is O, S, S=O, C=O, $SO_2$, NR(where R is an aryl group or an acyl group), C—C or $CR^4R^5$ (where $R^4$ and $R^5$ each are H, a lower alkyl group or an alkenyl group having 2 to 4 carbon atoms); n is 0 or 1; and $X^-$ is such an anion as a chloride ion, a bromide ion, a sulfate ion, a bisulfate ion, a nitrate ion, a hydroxy ion, a perchlorate ion, a trifluoromethane sulfonate ion, an acetate ion, a benzene sulfonate ion, a phenate ion, a tetrafluoroborate ion, a hexachlorophosphate ion, hexafluorophosphate ion, a hexachlorostannate ion, a hexafluoroarsenate ion, a hexafluoroantimonate ion, etc.

Specifically, the aromatic sulfonium salt includes, for example, triphenylsulfonium chloride, methyldiphenylsulfonium tetrafluoroborate, triphenylsulfonium hexafluorophosphate, triphenylsulfonium sulfate, diphenylnaphthylsulfonium trifluoromethane sulfonate, tritolylsulfonium nitrate, anisyldiphenylsulfonium hexafluoroantimonate, 4-butoxyphenyldiphenylsulfonium tetrafluoroborate, 4-chlorophenyldiphenylsulfonium acetate, tris(4-phenoxyphenyl)sulfonium hexafluorophosphate, di(4-ethoxyphenyl)methylsulfonium hexafluoroarsenate, 4-acetoxy-phenyldiphenylsulfonium carbonate, tris(4-thiomethoxyphenyl)sulfonium hexafluorophosphate, di(methoxysulfonylphenyl)methylsulfonium chloride, di(methoxynaphthyl)methylsulfonium tetrafluoroborate, tris(carbomethoxyphenyl)sulfonium hexafluorophosphate, 4-acetamidophenyldiphenylsulfonium perchlorate, methyl (n-butylphenothiazinyl)sulfonium bromide, etc. Preferably, triphenylsulfonium chloride is used.

The tertiary phosphine compound for use in the present invention is represented by the following general formula:

$PR^1R^2R^3$ where $R^1$, $R^2$ and $R^3$ are each a hydrocarbon group, for example, an alkyl group having 1 to 20 carbon atoms, an aryl group such as a phenyl group, etc., an aralkyl group such as a benzyl group, etc., or an alkoxyl group having 1 to 20 carbon atoms.

Specifically, the tertiary phosphine compound includes, for example, trimethylphosphine, triethylphosphine, tributylphosphine, trioctylphosphine, triphenylphosphine, triethyl phosphite, tributyl phosphite, tridecyl phosphite, etc. Preferably, triphenylphosphine is used.

The epoxy compound for use together with the tertiary phosphine compound includes, for example, various monofunctional or multifunctional epoxy compounds such as styrene oxide, 2-ethylhexylglycidyl ether, phenylglycidyl ether, divinylbenzene diepoxide, 2-(2,3-epoxypropyl)phenylglycidyl ether, 2,6-(2,3-epoxypropyl)phenylglycidyl ether, vinylcyclohexene-3-diepoxide, ethylene glycol diglycidyl ether, phthalic acid diglycidyl ester, epoxide of bisphenol A—epichlorohydrin condensation type, triepoxypropyl cyanurate, etc. Besides, epoxy compounds given in Examples which follow can be also used.

About 0.1 to about 10 parts by weight, preferably about 0.5 to about 5 parts by weight, of each of the tertiary phosphine compound and the epoxy compound is used per 100 parts by weight of blend rubber. Below about 0.1 parts by weight, no vulcanization products having desired properties can be obtained, whereas above about 10 parts by weight vulcanization products have a smaller stretchability and are less practical. The tertiary phosphine compound and the epoxy compound are used in a ratio of the former to the latter of 1: about 0.5 to about 2 by weight. When the epoxy compound is in a ratio of less than about 0.5, no effective vulcanization can be obtained, whereas, when the epoxy compound is in a ration of higher than about 2, vulcanization products have a smaller stretchability.

Besides these quaternary onium salt, tertiary sulfonium salt or tertiary phosphine compound—epoxy compound, the blend rubber vulcanization system contains an acid acceptor as an essential component to provide a vulcanizable blend rubber composition. As an acid acceptor, about 0. 1 to about 30 parts by weight, preferably about 1 to about 20 parts by weight, of at least one of oxides and hydroxides of metals of divalency or higher valency such as calcium hydroxide, magnesium oxide, zinc oxide, titanium oxide, lead oxide, etc. is used per 100 parts by weight of blend rubber.

It is preferable that the vulcanization system further contains about 0.1 to about 5 parts by weight of aromatic carboxylic acid per 100 parts by weight of blend rubber. The aromatic carboxylic acid includes, for example, unsubstituted or substituted monocarboxylic acids or polycarboxylic acids such as benzoic acid, phthalic acid, terephthalic acid, methylbenzoic acid, chlorobenzoic acid, nitrobenzoic acid, hydroxybenzoic acid, etc. Preferably, benzoic acid is used. These aromatic carboxylic acids can be also used as equimolar molecule compounds with the quaternary phosphonium salt (see JP-B-59-23577).

It is known that when benzoic acid is added to a belend rubber of acrylic copolymer elastomer and fluorine-containing elastomer, the anti-scorching property can be improved (see JP-A-58-63740). In other words, the addition of benzoic acid shows an action to lower the cross-linking rate, whereas in case of blendig the present acrylic copolymer elastomer with fluorine-containing elastomer, the addition of benzoic acid can effectively improve the cross-linking rate in contrast to the ordinary knowledge.

The present blend rubber composition can contain, besides the above-mentioned essential components, other additives, such as a reinforcing agent, a filler, an antioxidant, a stabilizer, a plasticizer, a lubricant, etc., if required and can be prepared by kneading with an open roll mixer, a Banbury mixer, a kneader, etc. and vulcanized (cocross-linked) by press vulcanization (press cure) at a temperature of about 150° to about 220° C. for about one to about 30 minutes and by gear oven vulcanization (post cure) at a temperature of abut 150° to about 220° C. for abut 2 to about 70 hours.

According to the present invention, cocross-linked vulcanization products having an intermediate heat resistance between the heat resistance of acrylic rubber and that of fluorine rubber and a good amine resistance can be provided by blending the present acrylic copolymer elastomer (acrylic rubber) with fluorine-containing rubber (fluorine rubber).

PREFERRED EMBODIMENTS OF THE INVENTION

Figure 1:
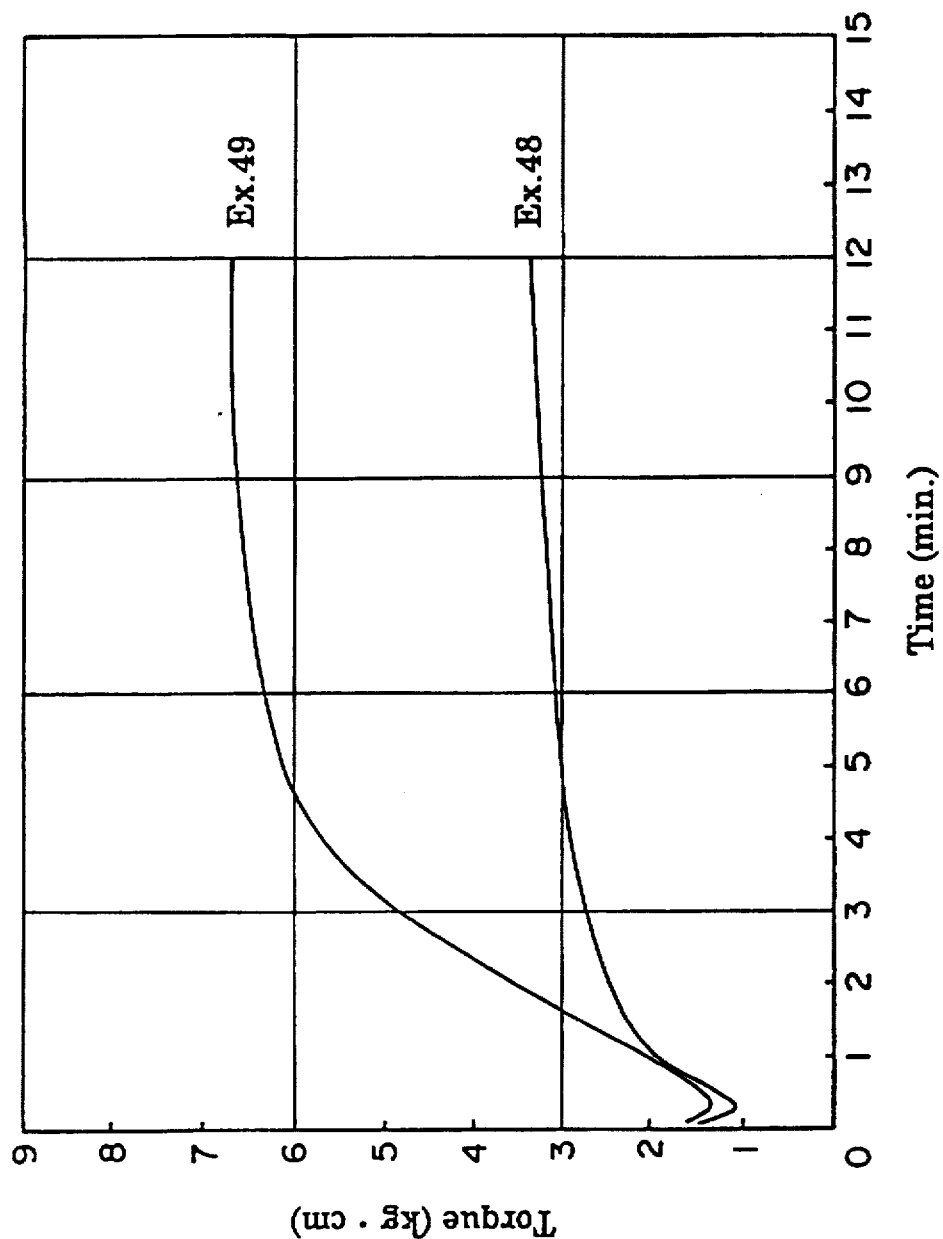
FIG. 1 is a diagram showing vulcanization curves in Examples 48 and 49.

The present invention will be described in detail below, referring to Examples.

REFERENCE EXAMPLE 1

(Synthesis of 4-hydroxybenzyl acrylate)

1400 g of methyl isobutyl ketone, 50 g of 4-hydroxybenzyl alcohol and 40 g of triethylamine were charged into a separable flask having a capacity of 3 liters, provided with a stirrer and a nitrogen gas feed tube, and deaerated for 30 minutes, and then 33 g of acrylic acid chloride was dropwise added thereto at 3° C. over 50 minutes. Then, stirring was continued at room temperature for 3 hours. After completion of the reaction, the reaction mixture was recovered by filtration. The filtrate was washed with 0.5N hydrochloric acid and with water, dehydrated over anhydrous sodium sulfate, and then subjected to silica gel column chromatography (eluent: n-hexane/ethyl acetate =10/1 by volume) to obtain the desired fraction. By distilling off the methyl isobutyl ketone solvent from the fraction under reduced pressure, 15 g of 4-hydroxybenzyl acrylate of the following chemical formula was obtained (yield: 26%):

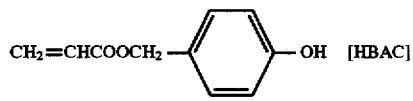

REFERENCE EXAMPLE 2

(Synthesis of 4-hydroxyphenetyl acrylate)

Reaction was carried out in the same manner as in Reference Example 1, except that 55 g of 4-hydroxyphenetyl alcohol was used in place of 4-hydroxybenzyl alcohol, and 21 g of 4-hydroxyphenetyl acrylate of the following chemical formula was obtained (yield: 34%):

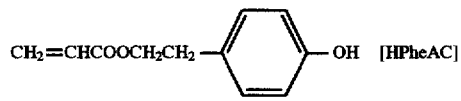

REFERENCE EXAMPLE 3

(Synthesis of 4-acetoxybenzyl acrylate)

1400 g of isopropyl ether, 100 g of 4-hydroxybenzyl acrylate and 53 g of pyridine were charged into a separable flask of the same type as used in Reference Example 1, and the flask inside gas was replaced with a nitrogen gas over 30 minutes, while ice cooling the flask. Then, 125 g of acetic anhydride was dropwise added thereto at 3° C. over 2 hours, and stirring was continued at room temperature for 3 hours. After completion of the reaction, the reaction mixture was washed with 0.5N hydrochloric acid and then with water. By distilling off isopropyl ether from the reaction mixture, 113 g of 4-acetoxybenzyl acrylate of the following chemical formula was obtained (yield: 91%):

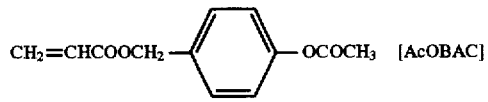

REFERENCE EXAMPLE 4

(Synthesis of p-trimethylsilyloxybenzyl acrylate)

1500 g of methyl isobutyl ketone and 100 g of 4-hydroxybenzyl acrylate were charged into a separable flask of the same type as used in Reference Example 1, and cooled to −5° C. while replacing the flask inside gas with a nitrogen gas, and then 67 g of trimethylchlorosilane was dropwise added thereto over one hour, and then stirring was continued for 2 hours. After completion of the reaction, the reaction mixture was washed with water and methyl isobutyl ketone was distilled off, whereby 83 g of p-trimethylsilyloxybenzyl acrylate of the following chemical formula was obtained (yield: 59%):

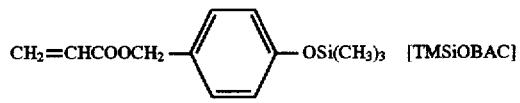

REFERENCE EXAMPLE 5

(Synthesis of p-hydroxybenzoyloxybutyl acrylate)

2000 g of dichloromethane, 40.0 g of 4-hydroxybenzoic acid, 39. 6 g of 4-hydroxybutyl acrylate and 0.05 g of methoquinone were charged into a separable flask of the same type as used in Reference Example 1, and then a liquid mixture consisting of 54.0 g of N,N'-dicyclohexylcarbodiimide, 5.9 g of dimethylaminopyridine and 60 g of dichloromethane was dropwise added thereto at room temperature over 4 hours, while replacing the flask inside gas with a nitrogen gas. After the same treatment as in Reference Example 1, 3.8 g of p-hydroxybenzoyloxybutyl acrylate of the following chemical formula was obtained (yield: 5%):

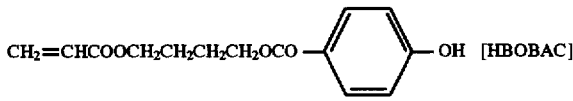

REFERENCE EXAMPLE 6

(Synthesis of vinyl p-hydroxybenzoyloxy acetate)

1500 g of methyl isobutyl ketone, 69 g of 4-hydroxybenzoic acid and 58.0 g of triethylamine were charged into a separable flask of the same type as used in Reference Example 1, and heated to 80° C., while replacing the flask inside gas with a nitrogen gas, and then 57 g of vinyl monochloroacetate was dropwise added thereto over 2 hours, and then stirring was continued for 6 hours. After completion of the reaction, the reaction mixture was washed with water and dehydrated over anhydrous sodium sulfate.

After the same treatment as in Reference Example 1, 34.8 g of vinyl p-hydroxybenzoyloxy acetate of the following chemical formula was obtained (yield: 60%):

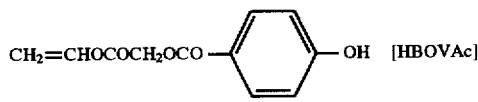

REFERENCE EXAMPLE 7

(Synthesis of p-hydroxybenzoyloxyethyl vinyl ether)

Reaction was carried out in the same manner as in Reference Example 6, except that 45.3 g of 2-chloroethyl vinyl ether was used in place of vinyl monochloroacetate and 280 g of an aqueous 10% sodium hydroxide solution was used in place of triethylamine, whereby 29.6 g of p-hydroxybenzoyloxyethyl vinyl ether of the following chemical formula was obtained (yield: 28%):

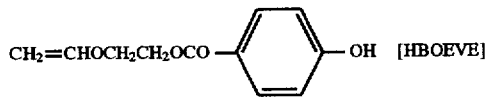

REFERENCE EXAMPLE 8

(Synthesis of p-hydroxybenzoyloxymethylstyrene)

Reaction was carried out in the same manner as in Reference Example 6, except that 72.4 g of p-chloromethylstyrene was used in place of vinyl monochloroacetate. After completion of the reaction 3 liters of water was added to the reaction mixture and the precipitated powder was recovered therefrom and washed with n-hexane, whereby 36.2 g of p-hydroxybenzoyloxymethylstyrene of the following chemical formula was obtained (yield: 30%):

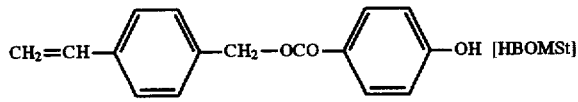

EXAMPLE 1

The following compounds were charged into a separable flask having a capacity of 3 liters, provided with a stirrer, a nitrogen gas feed tube and a depressurizing means:

| | |
|---|---|
| Ethyl acrylate | 250 g |
| n-Butyl acrylate | 250 g |
| HBAC of Reference Example 1 | 25 g |
| Sodium laurylsulfate | 27.5 g |
| Water | 750 g |

After repetitions of deaeration and nitrogen gas replacement to completely remove oxygen from the flask, a polymerization initiator mixture consisting of the following compounds was added thereto to start polymerization reaction at room temperature:

| | |
|---|---|
| Sodium hydrosulfite | 0.05 g |
| Sodium formaldehyde sulfoxylate | 0.01 g |
| t-Butyl hydroperoxide | 0.025 g |

Then, the reaction was continued at 50° C. for 6 hours until the polymerization conversion reached to 90%. The resulting latex was coagulated, thoroughly washed with water and dried, whereby acrylic copolymer elastomer A having Mooney viscosity (100° C.) of 42 pts and a HBAC copolymerization ratio of 4.3% by weight (determined by $^1$H-NMR) was obtained.

EXAMPLES 2 TO 11

Copolymerization reaction was carried out in the same manner as in Example 1, using monomer charge compositions given in the following Table 1, and acrylic copolymer elastomers B to K were obtained.

TABLE 1

| Example No. | 2 | 3 | 4 | 5 | 6 | 7 | 8 | 9 | 10 | 11 |
|---|---|---|---|---|---|---|---|---|---|---|
| [Monomer; g] | | | | | | | | | | |
| Ethyl acrylate | 250 | 250 | 250 | 250 | 250 | 250 | 250 | 250 | 250 | 250 |
| n-Butyl acrylate | 250 | 150 | 225 | 250 | 250 | 150 | 200 | 250 | 250 | 250 |
| 2-Methoxyethyl acrylate | | 100 | | | | | | | | |
| Styrene | | | 25 | | | | | | | |
| HBAC of Ref. Ex. 1 | 15 | 25 | 25 | | | | | | | |
| HPheAC of Ref. Ex. 2 | | | | 25 | | | | | | |
| AcOBAC of Ref. Ex. 3 | | | | | 25 | | | | | |
| TMSiOBAC of Ref. Ex. 4 | | | | | | 25 | | | | |
| HBOBAC of Ref. Ex. 5 | | | | | | | 25 | | | |
| HBOVAc of Ref. Ex. 6 | | | | | | | | 25 | | |
| HBOEVE of Ref. Ex. 7 | | | | | | | | | 25 | |
| HBOMSt of Ref. Ex. 8 | | | | | | | | | | 25 |

TABLE 1-continued

| Example No. | 2 | 3 | 4 | 5 | 6 | 7 | 8 | 9 | 10 | 11 |
|---|---|---|---|---|---|---|---|---|---|---|
| [Copolymer elastomer] | | | | | | | | | | |
| Abbreviation | B | C | D | E | F | G | H | I | J | K |
| Mooney viscosity (pts) | 42 | 42 | 38 | 32 | 40 | 33 | 34 | 37 | 35 | 40 |
| Copoly. ratio of components of Ref. Ex. 1 to 8 (%) | 2.7 | 4.2 | 4.0 | 4.1 | 2.4 | 2.6 | 3.2 | 4.0 | 3.7 | 3.1 |

COMPARATIVE EXAMPLE 1

Copolymerization reaction was carried out in the same manner as in Example 1, except that 10 g of p-chloromethylstyrene was used in place of HBAC of Reference Example 1, whereby acrylic copolymer elastomer L having Mooney viscosity of 45 pts was obtained.

COMPARATIVE EXAMPLE 2

Copolymerization reaction was carried out in the same manner as in Example 1, except that 15 g of p-hydroxystyrene was used in place of HBAC of Reference Example 1. During the reaction yellow precipitates were observed on the latex surface just after the addition of the polymerization initiator mixture, and at the end of copolymerization reaction yellowish brown resinous precipitates were observed.

The latex freed from the resinous precipitates was coagulated, thoroughly washed with water and dried, whereby acrylic copolymer elastomer M was obtained. It was observed by $^1$H-NMR analysis of the thus obtained acrylic copolymer elastomer M that no benzene ring peak was observed around 7 ppm and it was found that p-hydroxystyrene was not copolymerized.

REFERENCE EXAMPLE 9

(Production of VdF-HFP-TFE terpolymer rubber)

1500 ml of deionized water and 7.5 g of ammonium perfluorooctanoate were charged into an autoclave having a capacity of 3 liters, and after the autoclave inside gas was thoroughly replaced with a nitrogen gas, the autoclave was pressurized to an inside pressure of 8 kg/cm$^2$ gauge with a feed gas mixture of vinylidene fluoride (VdF)/hexafluoropropene (HFP)/tetrafluoroethylene (TFE) in a ratio of 22/66/12 by weight and then the autoclave inside temperature was elevated to 60° C. with stirring. Then, 3.5 g of ammonium persulfate dissolved in 50 ml of deionized water was added thereto under pressure. Then, a supplementary gas mixture of VdF/HFP/TFE in a ratio of 39/46/15 by weight was added thereto until the autoclave inside pressure reached 10 kg/cm$^2$ gauge to start polymerization. Immediately after the start of polymerization reaction, the autoclave inside pressure started to decrease, and when the autoclave inside pressure was lowered to 9 kg/cm$^2$ gauge, the autoclave was repressurized to 10 kg/cm$^2$ gauge with the latter gas mixture. The polymerization reaction was continued for 5 hours, while maintaining the autoclave inside pressure at a pressure of 9 to 10 kg/cm$^2$ gauge likewise. Then, the unreacted gas mixture was purged from the autoclave to discontinue the reaction. The thus obtained latex was coagulated, thoroughly washed with water and dried, whereby fluorine-containing elastomer A having a molar composition ratio of VdF/HFP/TFE=60/19/21 (determined by $^{19}$gF-NMR analysis) and a Mooney viscosity of 74 pts was obtained.

REFERENCE EXAMPLE 10

In Reference Example 9, the feed gas mixture composition was changed to VdF/HFP in a ratio of 24.5/75.5 by weight and the supplementary gas mixture composition to VdF/HFP in a ratio of 63.5/36.5 by weight. Fluorine-containing elastomer B having a molar composition ratio of VdF/HFP=78/22 and a Mooney viscosity of 92 pts was obtained.

REFERENCE EXAMPLE 11

In Reference Example 9, the feed gas mixture composition was changed to VdF/HFP/TFE in a ratio of 27/57/16 by weight and the supplementary gas mixture composition to VdF/HFP/TFE in a ratio of 40/34/26 by weight. Furthermore, 4.4 g of 1-bromo-2-iodoperfluoroethane was added to the reaction mixture under pressure before the addition of the aqueous ammonium persulfate solution. Fluorine-containing elastomer C having a molar composition ratio of VdF/HFP/TFE=58/20/22 and a Mooney viscosity of 81 pts was obtained.

REFERENCE EXAMPLE 12

In Reference Example 9, the feed gas mixture composition was changed to VdF/HFP/CTFE (chlorotrifluoroethylene) in a ratio of 43/55/2 by weight and the supplementary gas mixture composition to VdF/HFP/CTFE in a ratio of 73/25.5/1.5 by weight. Fluorine-containing elastomer D having a molar composition ratio of VdF/HFP/CTFE=77/21.8/1.2 and a Mooney viscosity of 65 pts was obtained.

EXAMPLE 12

Acrylic copolymer elastomer A and fluorine-containing elastomer A were mixed in a ratio of 50:50 by weight by open roll (roll method), whereby blend rubber A having a Mooney viscosity of 38 pts was obtained.

EXAMPLE 13

Acrylic copolymer elastomer A and copolymer rubber of vinylidene fluoride/propylene (Aflus 200, trademark of a product made by Asahi Glass K. K., Japan) were mixed in a ratio of 50:50 by weight by roll method, whereby blend rubber B having a Mooney viscosity of 49 pts was obtained.

EXAMPLES 14 TO 29

Blend rubbers C to R were prepared by latex method of mixing a copolymer latex at the production stage of acrylic copolymer elastomer (acrylic rubber) and a copolymer latex at the production stage of fluorine-containing elastomer (fluorine rubber) in such ratios as to provide desired ratios of the acrylic rubber to the fluorine rubber by weight, as given in the following Table 2, and stirring the mixture for 30 minutes, followed by coagulated, thorough washing with water and drying.

TABLE 2

| Example No. | Acrylic rubber (parts by weight) | | Fluorine rubber (parts by weight) | | Blend rubber | Mooney viscosity (pts) |
| --- | --- | --- | --- | --- | --- | --- |
| 14 | A | 50 | A | 50 | C | 48 |
| 15 | A | 75 | A | 25 | D | 33 |
| 16 | A | 25 | A | 75 | E | 68 |
| 17 | A | 50 | B | 50 | F | 50 |
| 18 | A | 50 | C | 50 | G | 47 |
| 19 | A | 50 | D | 50 | H | 36 |
| 20 | B | 50 | A | 50 | I | 35 |
| 21 | C | 50 | A | 50 | J | 33 |
| 22 | D | 50 | A | 50 | K | 36 |
| 23 | E | 50 | A | 50 | L | 34 |
| 24 | F | 50 | A | 50 | M | 39 |
| 25 | G | 50 | A | 50 | N | 40 |
| 26 | H | 50 | A | 50 | O | 46 |
| 27 | I | 50 | A | 50 | P | 36 |
| 28 | J | 50 | A | 50 | Q | 42 |
| 29 | K | 50 | A | 50 | R | 37 |

COMPARATIVE EXAMPLES 3 TO 6

Blend rubbers S to V were prepared by blending acrylic copolymer elastomer L and fluorine-containing elastomer A or B in various ratios by weight by roll method (Comparative Example 3) or by latex method (Comparative Example 4 to 6).

The blend ratios of the copolymer elastomers used and the Mooney viscosity of the resulting blend rubbers are shown in the following Table 3.

TABLE 3

| | Comparative Example | | | |
| --- | --- | --- | --- | --- |
| | 3 | 4 | 5 | 6 |
| Acrylic rubber L (parts by weight) | 50 | 50 | 75 | 25 |
| Fluorine rubber A (parts by weight) | 50 | | | |
| Fluorine rubber B (parts by weight) | | 50 | 25 | 75 |
| Blend rubber | S | T | U | V |
| Mooney viscosity (pts) | 32 | 43 | 36 | 55 |

EXAMPLES 30 AND 31

| | |
| --- | --- |
| Blend rubber A (roll method) | 100 parts by weight (Ex. 30) |
| Blend rubber B (roll method) | 100 parts by weight (Ex. 31) |
| Stearic acid | 1 parts by weight |
| Antioxidant *) (Nocrack CD, trademark of a product made by Ouchi-Shinko Kagaku K.K., Japan) | 2 parts by weight |
| MT carbon black | 30 parts by weight |

TABLE 3-continued

| | |
| --- | --- |
| Calcium hydroxide | 5 parts by weight |
| Magnesium oxide | 2 parts by weight |
| Benzyltriphenylphosphonium chloride | 0.4 parts by weight |

*) 4,4'-bis(α,α-dimethylbenzyl)diphenylamine

The above components were kneaded by open roll and the resulting kneaded mixtures were subjected to press vulcanization (press cure) at 180° C. for 10 minutes and then to gear oven vulcanization (post cure) at 180° C. for 24 hours. Vulcanization products were subjected to determination or observation for the following items according to JIS K-6301.

Physical properties: Measurement of hardness (Hs), 100% modulus (Mo 100), tensile strength ($T_B$) and elongation ($E_B$)

Heat aging test: Measurement of changes in the physical properties of the vulcanization products before and after heating at 200° C. for 70 hours Deterioration test with engine oil: Observation of occurrence of cracks on the test piece surface after dipping the test piece in engine oil (SG grade, 10W-30) at 175° C. for 70 hours (used as a simple and practical evaluation method for amine resistance)

EXAMPLES 32

In Example 30, blend rubber C (latex method) was used in place of blend rubber A and the amount of benzyltriphenylphosphonium chloride was changed to 3 parts of weight.

EXAMPLES 33 TO 48

In Example 30, blend rubbers C to R were used in place of blend rubber A.

EXAMPLE 49

In Example 48 using blend rubber R in place of blend rubber A of Example 30, a kneaded product further containing one part by weight of benzoic acid was subjected to vulcanization.

Results of determination and tests of the vulcanization products in Examples 30 to 49 are shown in the following Table 4, where no crack occurrence was observed at all in the deterioration test with engine oil throughout the Examples, and vulcanization curves were deterimined at 180° C. with JSR-III type curastometer as a measuring instrument in Examples 48 and 49, as shown in FIG. 1.

TABLE 4

| Ex. No. | Blend rubber | Hs (pts) | Mo 100 (MPa) | $T_B$ (MPa) | $E_B$ (%) | Hs change (pts) | $T_B$ change (%) | $E_B$ change (%) |
|---|---|---|---|---|---|---|---|---|
| 30 | A | 50 | 1.4 | 6.3 | 330 | +6 | −14 | −27 |
| 31 | B | 51 | 1.9 | 8.1 | 190 | +6 | +20 | −40 |
| 32 | C | 50 | 1.6 | 6.4 | 340 | +8 | +20 | −26 |
| 33 | C | 50 | 1.8 | 7.1 | 260 | +4 | +12 | −20 |
| 34 | D | 40 | 0.7 | 3.2 | 540 | +15 | −29 | −40 |
| 35 | E | 59 | 0.9 | 4.8 | 300 | +6 | +8 | −20 |
| 36 | F | 52 | 1.6 | 6.3 | 280 | +6 | 0 | −29 |
| 37 | G | 50 | 0.9 | 5.5 | 350 | +4 | +9 | −25 |
| 38 | H | 50 | 1.4 | 5.9 | 300 | +8 | +10 | −40 |
| 39 | I | 50 | 1.8 | 6.9 | 270 | +5 | +2 | −18 |
| 40 | J | 48 | 1.4 | 5.5 | 350 | +9 | −20 | −29 |
| 41 | K | 51 | 2.1 | 5.3 | 300 | +4 | −25 | +27 |
| 42 | L | 50 | 1.9 | 6.4 | 320 | +4 | +2 | −6 |
| 43 | M | 48 | 1.3 | 6.0 | 420 | +7 | +12 | −29 |
| 44 | N | 52 | 2.1 | 6.1 | 290 | +4 | +2 | −10 |
| 45 | O | 49 | 1.6 | 6.2 | 350 | +5 | −3 | −20 |
| 46 | P | 49 | 1.7 | 4.8 | 430 | +7 | +5 | −19 |
| 47 | Q | 50 | 1.8 | 5.9 | 320 | +4 | +1 | −8 |
| 48 | R | 50 | 1.8 | 6.1 | 300 | +3 | 0 | −15 |
| 49 | R | 53 | 2.2 | 6.5 | 260 | +2 | +5 | −15 |

EXAMPLE 50

The following components were kneaded by open roll, and the resulting kneaded mixture was subjected to press vulcanization at 180° C. for 15 minutes and then to gear oven vulcanization at 190° C. for 24 hours. The vulcanization product was determined for physical properties and also subjected to heat aging test and deterioration test with engine oil in the same manner as in Example 30:

| | |
|---|---|
| Blend rubber R | 100 parts by weight |
| Stearic acid | 1 parts by weight |
| Antioxidant (Nocrack CD) | 2 parts by weight |
| FEF carbon black | 25 parts by weight |
| Calcium hydroxide | 4 parts by weight |
| Benzoic acid | 0.5 parts by weight |
| Triphenylphosphonium chloride (product made by Fulka Co.) | 1 parts by weight |

EXAMPLES 51 TO 59

The following components were kneaded and the resulting kneaded mixtures were subjected to vulcanization, and the vulcanization products were subjected to determination of physical properties and tests in the same manner as in Example 50:

| | |
|---|---|
| Blend rubber R | 100 parts by weight |
| Stearic acid | 1 parts by weight |
| Antioxidant (Nocrack CD) | 2 parts by weight |
| FEF carbon black | 25 parts by weight |
| Calcium hydroxide | 4 parts by weight |
| Triphenylphospine (product of Wako Junyaku K.K., Japan) | 4 parts by weight (Exs. 51 to 58) |
| Triphenylphospine (product of Wako Junyaku K.K., Japan) | 2 parts by weight (Ex. 59) |
| Epoxy compound (Epoxy compound; Gly = glycidyl group) | (as given below) |
| Example 51: Styrene oxide (product of Wako Junyaku K.K., Japan) | 2 parts by weight |
| Example 52: $C_6H_5O(CH_2CH_2O)_5Gly$ (Denacol EX-145; trademark of a product made by Nagase Sangyo K.K., Japan) | 2 parts by weight |
| Example 53: Dibromophenyl glycidyl ether (Denacol EX-147, trademark of a product made by Nagase Sangyo K.K., Japan) | 2 parts by weight |
| Example 54: $CH_3(CH_2)_{11}O(CH_2CH_2O)_{15}Gly$ (Denacol EX-171, trademark of a product made by Nagase Sangyo K.K., Japan) | 2 parts by weight |
| Example 55: Bisphenol A diglycidyl ether (Epikote 828, trademark of product made by Yuka-Shell epoxy K.K., Japan) | 4 parts by weight |
| Example 56: Epikote 828 | 2 parts by weight |
| Example 57: $GlyO[C_6H_5COOCH_2CH(OH)CH_2O]nC_6H_5COOGly$ (U-Quick 103, trademark of a product made by Ueno Seiyaku K.K, Japan) | 4 parts by weight |
| Example 58: Tris(2,3-epxoypropyl)isocyanurate (TEPIC, trademark of a product made by Nissan Kagaku Kogyo K.K., Japan) | 4 parts by weight |
| Example 59: N,N,N',N'-tetraglycidyl-bis(p-aminophenyl)-methane (Epototo YH-434, trademark of a product made by Toto Kasei Kagaku Kogyo K.K., Japan) | 2 parts by weight |

Results of determination of physical properties and tests in Examples 50 to 59 are shown in the following Table 5, where no crack occurrence was observed at all in the deterioration test with engine oil throughout the Examples.

TABLE 5

| Ex. No. | Hs (pts) | Mo 100 (MPa) | $T_B$ (MPa) | $E_B$ (%) | Hs change (pts) | $T_B$ change (%) | $E_B$ change (%) |
|---|---|---|---|---|---|---|---|
| 50 | 63 | 3.2 | 7.9 | 340 | +6 | +3 | −41 |
| 51 | 70 | 5.1 | 9.7 | 210 | +2 | +3 | −23 |
| 52 | 65 | 3.3 | 7.5 | 270 | +8 | +24 | −29 |
| 53 | 67 | 3.5 | 8.4 | 270 | +4 | +17 | −26 |
| 54 | 63 | 2.7 | 6.2 | 250 | +8 | +36 | −37 |
| 55 | 78 | 7.8 | 9.5 | 170 | +4 | +13 | −38 |
| 56 | 72 | 5.5 | 9.1 | 220 | +5 | +5 | −30 |
| 57 | 79 | 8.4 | 9.8 | 170 | +3 | +17 | −32 |

TABLE 5-continued

| Ex. No. | Hs (pts) | Mo 100 (MPa) | $T_B$ (MPa) | $E_B$ (%) | Hs change (pts) | $T_B$ change (%) | $E_B$ change (%) |
|---|---|---|---|---|---|---|---|
| 58 | 73 | 6.7 | 9.6 | 130 | +3 | +5 | −23 |
| 59 | 77 | 6.6 | 9.7 | 190 | +2 | −3 | −17 |

COMPARATIVE EXAMPLE 7

The following components were kneaded and vulcanized in the same manner as in Example 30:

| | |
|---|---|
| Acrylic copolymer elastomer L | 100 parts by weight |
| Stearic acid | 1 parts by weight |
| Antioxidant (Nocrack CD) | 2 parts by weight |
| HAF carbon black | 60 parts by weight |
| Calcium hydroxide | 5 parts by weight |
| Magnesium oxide | 2 parts by weight |
| Bisphenol AF | 1 parts by weight |
| Benzyltriphenylphosphonium chloride | 4 parts by weight |

COMPARATIVE EXAMPLE 8

The following components were kneaded and vulcanized in the same manner as in Example 30:

| | |
|---|---|
| Acrylic copolymer elastomer L | 100 parts by weight |
| Stearic acid | 1 parts by weight |
| Antioxidant (Nocrack CD) | 2 parts by weight |
| HAF carbon black | 60 parts by weight |
| 2,4,6-trimercaptotriazine | 0.5 parts by weight |
| Sodium stearate | 2 parts by weight |

COMPARATIVE EXAMPLE 9

| | |
|---|---|
| Fluorine-containing elastomer A | 100 parts by weight |
| MT carbon black | 25 parts by weight |
| Calcium hydroxide | 5 parts by weight |
| Magnesium oxide | 2 parts by weight |
| Bisphenol AF | 2 parts by weight |
| Benzyltriphenylphosphonium chloride | 0.4 parts by weight |

The above components were kneaded and vulcanized in the same manner as in Example 30, except that the secondary vulcanization was carried out at 230° C. for 24 hours. Results of determination of physical properties and tests in Comparative Examples 7 to 9 are shown in the following Table 6, where no crack occurrence was observed in the deterioration test with engine oil in Comparative Examples 7 and 8, but crack occurrence were observed in Comparative Example 9.

COMPARATIVE EXAMPLES 10 TO 13

The following components were kneaded and vulcanized in the same manner as in Example 30:

| | |
|---|---|
| Blend rubber S | 100 parts by weight (Comp. Ex. 10) |
| Blend rubber T | 100 parts by weight (Comp. Ex. 11) |
| Blend rubber U | 100 parts by weight (Comp. Ex. 12) |
| Blend rubber V | 100 parts by weight (Comp. Ex. 13) |
| Stearic acid | 1 parts by weight |
| Antioxidant (Nocrack CD) | 2 parts by weight |
| MT carbon black | 30 parts by weight |
| Calcium hydroxide | 5 parts by weight |
| Magnesium oxide | 2 parts by weight |
| Bisphenol AF | 1 parts by weight |
| Benzyltriphenylphosphonium chloride | 0.4 parts by weight |

Results of determination of physical properties and tests in Comparative Examples 10 to 13 are shown in the following Table 6, where no crack occurrence was observed at all in the deterioration test with engine oil throughout Comparative Examples 10 and 13.

TABLE 6

| Comp. Ex. No. | Hs (pts) | Mo 100 (MPa) | $T_B$ (MPa) | $E_B$ (%) | Hs change (pts) | $T_B$ change (%) | $E_B$ change (%) |
|---|---|---|---|---|---|---|---|
| 7 | 48 | 0.4 | 5.1 | 460 | +19 | +4 | −69 |
| 8 | 70 | 6.9 | 16.7 | 180 | +11 | −44 | −44 |
| 9 | 72 | 4.1 | 11.6 | 310 | +1 | +1 | −3 |
| 10 | 58 | 3.1 | 8.5 | 260 | +7 | −33 | −28 |
| 11 | 57 | 2.8 | 8.1 | 250 | +6 | −37 | −36 |
| 12 | 48 | 1.4 | 3.5 | 490 | +17 | +14 | −49 |
| 13 | 70 | 1.3 | 8.6 | 330 | +5 | −42 | −21 |

COMPARATIVE EXAMPLE 14

Acrylic copolymer elastomer M and fluorine-containing elastomer A were blended in a ratio of 50:50 by weight by roll method to prepare blend rubber W. The thus obtained blend rubber W was subjected to mixing, heading and vulcanization in the same manner as in Example 30. No cross-linking reaction took place at all.

What is claimed is:

1. An acrylic copolymer elastomer which comprises a copolymer of an alkyl acrylate having an alkyl group having 1 to 8 carbon atoms and an unsaturated ester compound represented by the following general formula:

(1) $CH_2\!=\!CRCOO(CH_2)_nPhOR'$, (2) $CH_2\!=\!CRCOO(CH_2)_nOCO(CH_2)_mPhOR'$, (3) $CH_2\!=\!CHOCO(CH_2)_nOCO(CH_2)_mPhOR'$ or (4) $CH_2\!=\!CHO(CH_2)_nOCO(CH_2)_mPhOR'$ where R is a hydrogen atom or a methyl group; R' is a hydrogen atom, an acyl group or a trialkylsilyl group; Ph is a phenylene group; n is an integer of 1 to 6; and m is 0 or an integer of 1 to 3.

2. An acrylic copolymer elastomer according to claim 1, wherein the copolymer bas a Mooney viscosity (100° C.) of about 10 to about 100 pts.

* * * * *